INVENTOR.

CHESTER A. BERNIER

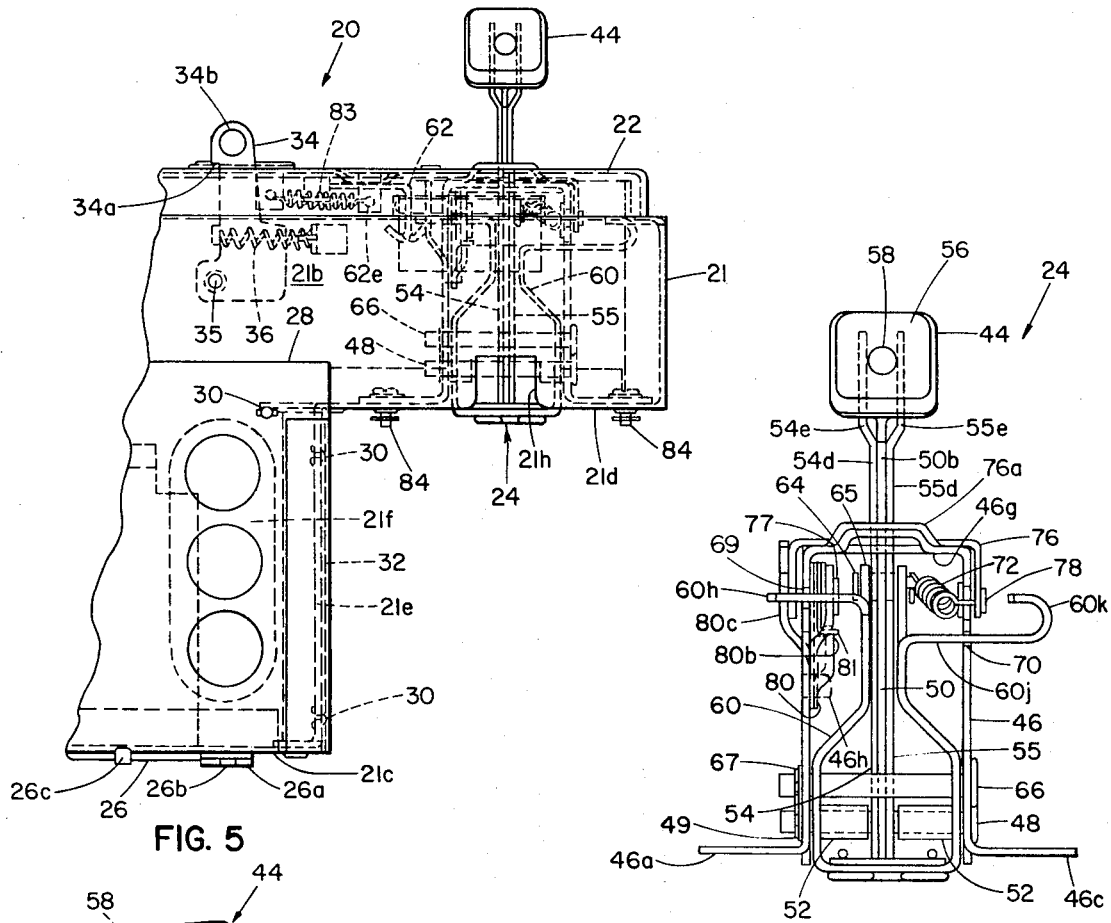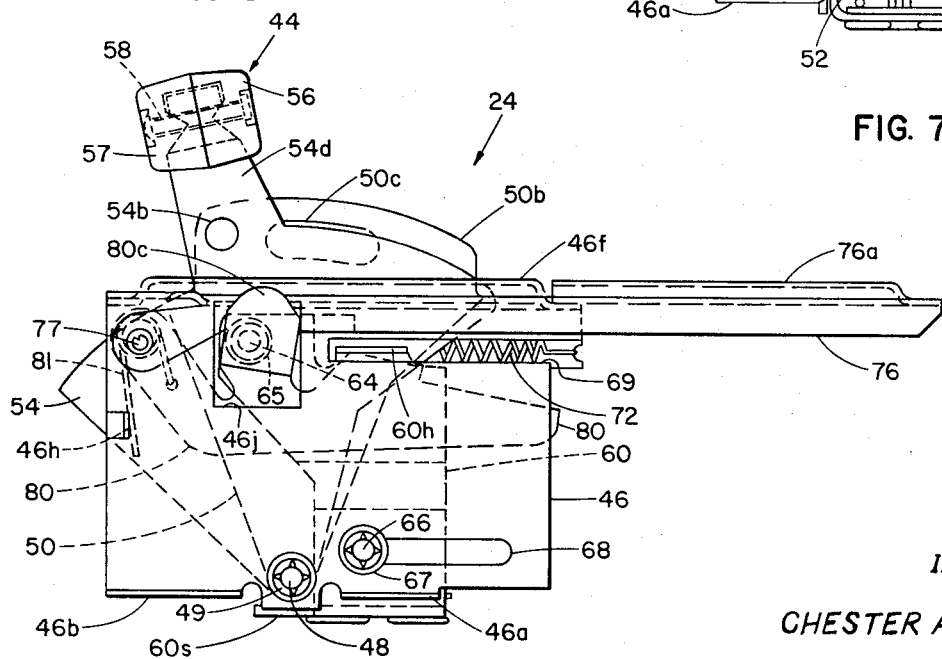

INVENTOR.
CHESTER A. BERNIER

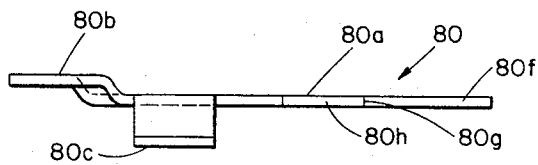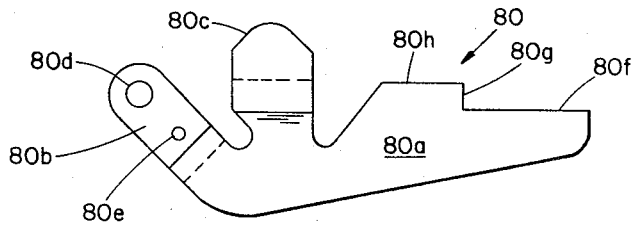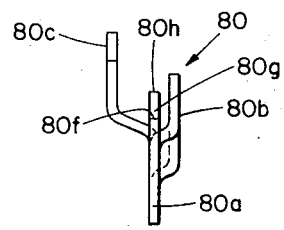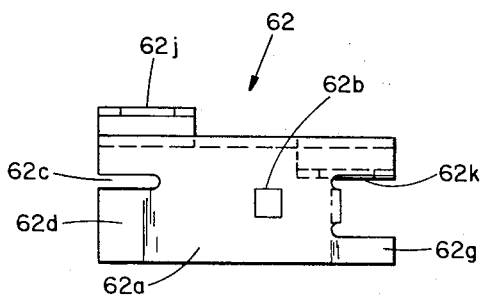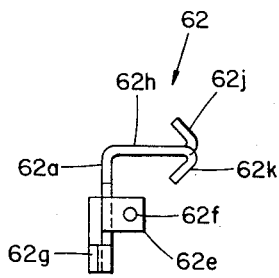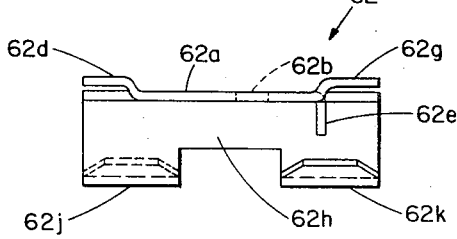

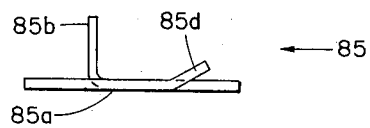
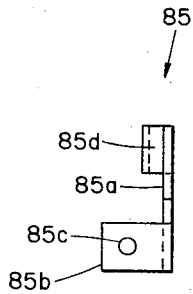
FIG. 22
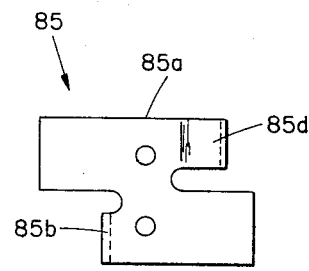
FIG. 20
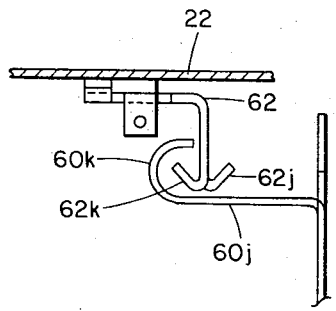
FIG. 24
FIG. 23
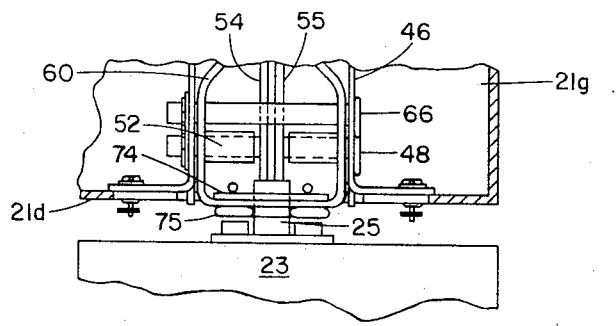
FIG. 25
INVENTOR.
CHESTER A. BERNIER United States Patent Office 3,714,387
Patented Jan. 30, 1973

3,714,387
SELECTIVELY MOUNTABLE MOTOR STARTER UNIT WITH REVERSIBLY POSITIONABLE CIRCUIT BREAKER OPERATING MECHANISM
Chester A. Bernier, Lexington, Ky., assignor to Square D Company, Park Ridge, Ill.
Filed Apr. 28, 1971, Ser. No. 138,101
Int. Cl. H01h 3/02
U.S. Cl. 200—168 R 6 Claims

ABSTRACT OF THE DISCLOSURE

A motor starter unit is mountable selectively on opposite sides of a stack of bus bars of an electrical panelboard and includes a reversibly positionable circuit breaker operating mechanism. Interlocks are provided to prevent opening of a cover of the motor starter unit when a handle of the operating mechanism is in ON position, unless an interlock-defeating screw is first turned, and to prevent movement of the handle to ON position when the cover is open.

An electric circuit breaker forming a separable component of a motor starter unit is mountable selectively on opposite sides of a stack of bus bars of an electrical panelboard, being rotated through an angle of one hundred eighty degrees when moved from one side of the bus bars to the other. An object of the invention is to provide a motor starter unit operatively associable with such a circuit breaker and panelboard and also mountable selectively on opposite sides of the stack of bus bars, but without being rotated when moved from one side of the bus bars to the other.

Another object is to provide a motor starter unit mountable selectively on opposite sides of a stack of bus bars of an electrical panelboard in the same angular relationship therewith and including a reversibly positionable circuit breaker operating mechanism.

A further object is to provide a motor starter unit mountable directly on a circuit breaker panelboard in place of some circuit breakers but having a circuit breaker operating mechanism in operative association with another one of the circuit breakers which is mounted on the panelboard the same way it would be if it were not to be used in association with the motor starter unit.

These and other objects will become apparent when the following specification is considered along with the accompanying drawings in which:

FIG. 5 is a fragmentary right side view of the motor starter unit of FIG. 1;

FIG. 6 is a view of the circuit breaker operating mechanism looking in the direction of arrows 6—6 in FIG. 3;

FIG. 7 is a view of the circuit breaker operating mechanism from the right-hand side of FIG. 6;

FIG. 14 is a side view of a cover-handle interlock member of the circuit breaker operating mechanism;

FIG. 15 is a top view of the cover-handle interlock member of FIG. 14;

FIG. 16 is an end view of the cover-handle interlock member of FIG. 14;

FIG. 17 is a top view of an interlock bracket mounted on the front cover of the motor starter unit;

FIG. 18 is a side view of the interlock bracket of FIG. 17;

FIG. 19 is an end view of the interlock bracket of FIG. 17;

FIG. 20 is a front view of a bracket mounted inside the front cover of the motor starter unit;

FIG. 21 is a top view of the bracket of FIG. 20;

FIG. 22 is an end view of the bracket of FIG. 20;

FIG. 23 is an end view of the interlock bracket of FIGS. 17–19 showing its relation to a portion of the actuating member of FIGS. 11–13 as they appear in broken lines in FIG. 5 and with the circuit breaker operating mechanism mounted as in FIGS. 1–3;

Figure 3:
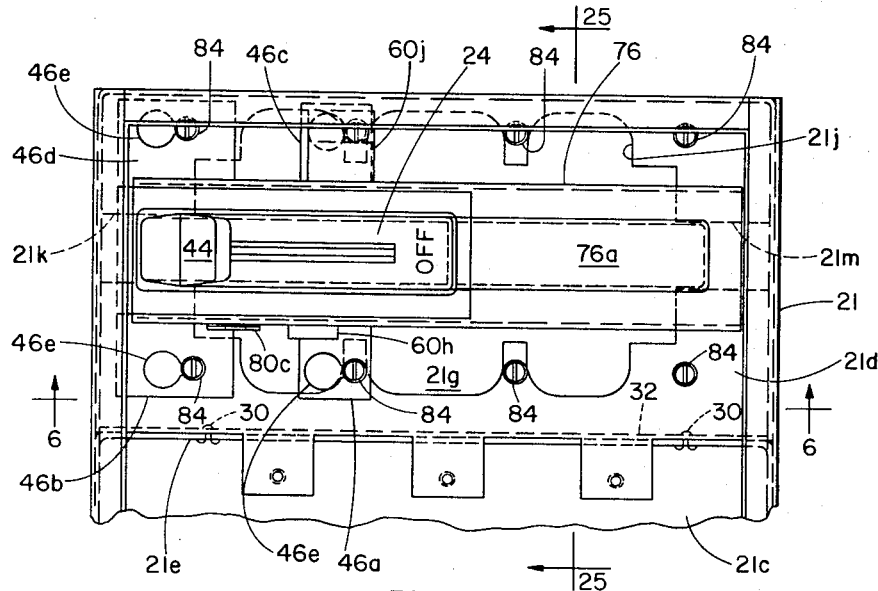
FIG. 3 is a fragmentary front view similar to the upper portion of FIG. 1, but with a front cover of the motor starter unit removed.
Figure 4:
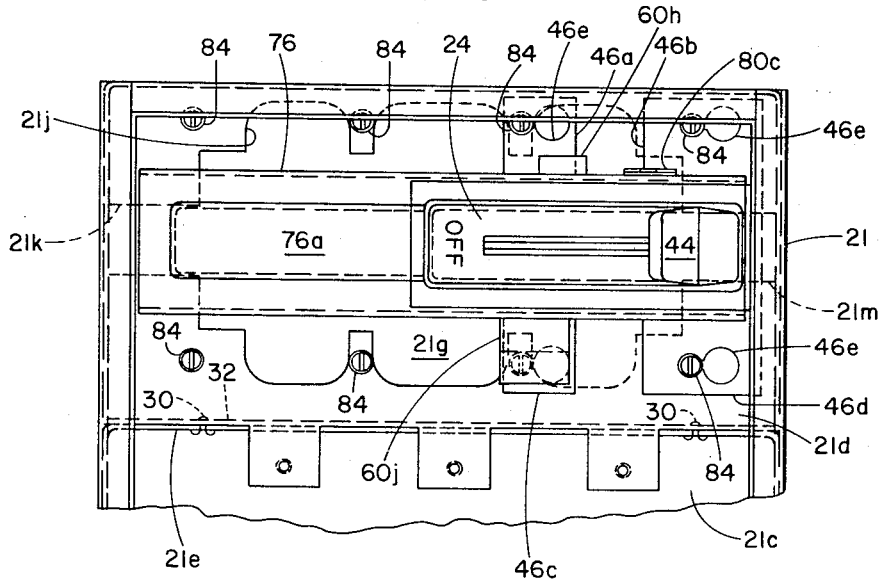
FIG. 4 is a fragmentary front view similar to FIG. 3, but with a circuit breaker operating mechanism of the motor starter unit reversed end-for-end and shifted toward the right from the position shown in FIG. 3.

FIG. 24 is an end view similar to FIG. 23, but showing the relation of the interlock bracket to a different portion of the actuating member for a mounting position of the circuit breaker operating mechanism as shown in FIG. 4; and FIG. 25 is a fragmentary sectional view taken substantially along the line 25—25 of FIG. 3 but including a portion of a circuit breaker having an operating handle connected to the circuit breaker operating mechanism.

Figure 1:
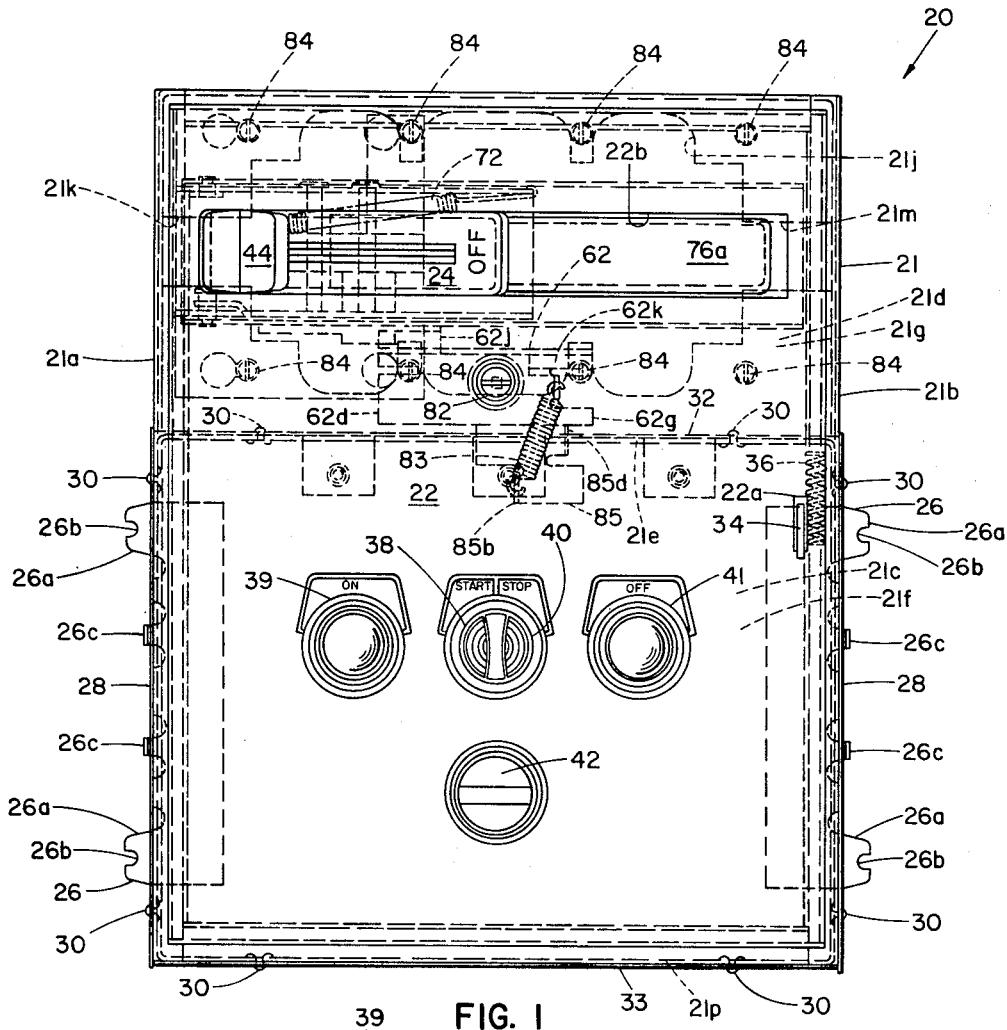
FIG. 1 is a front view of a motor starter unit constructed in accordance with the invention and with a handle of a circuit breaker operating mechanism in an ON position.
Figure 2:
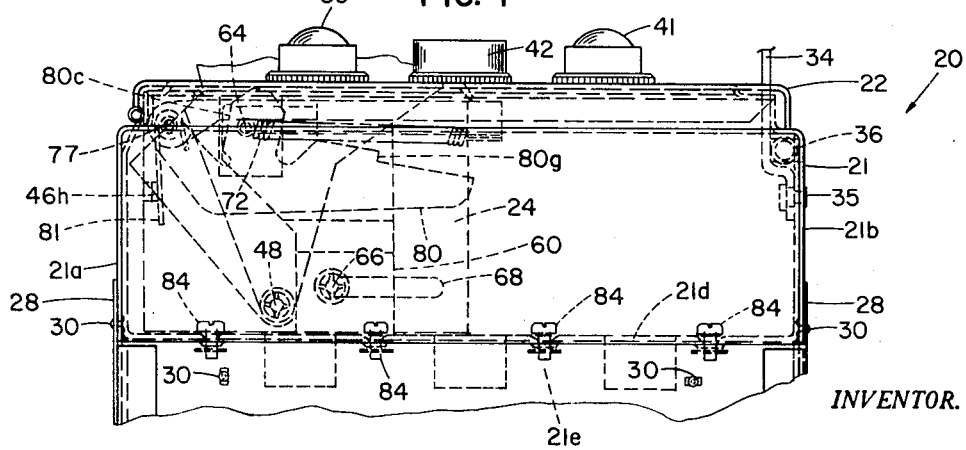
FIG. 2 is a fragmentary bottom view of the motor starting unit of FIG. 1.

A motor starter unit 20 constructed in accordance with the invention is shown in FIGS. 1, 2, and 5. The unit 20 is designed for use on electrical panelboards of the type disclosed in Pat. No. 3,354,357, issued Nov. 21, 1967, and is mountable selectively on opposite sides of a central bus bar stack of the panelboard without change of angular orientation with respect to the panelboard.

The unit 20 includes an open-front box 21 inwardly flanged at the front and normally closed by a flanged cover 22 pivotally mounted on a left side 21a of the box. The sides of the box 21 are generally L-shaped, a right side 21b being fragmentarily shown in FIG. 5, and the rear of the box is defined by a stepped rear wall including a relatively deep wall portion 21c and a relatively shallow wall portion 21d connected by a normally horizontal wall portion 21e. Thus, the box 21 includes a relatively deep lower compartment 21f for housing the motor controller and accessories (contactor, control transformer, overload switch, etc.), which form no part of the present invention and are not shown, and a relatively shallow upper compartment 21g for housing an external circuit breaker operating mechanism 24 to be described. A molded-case circuit breaker 23 (FIG. 25) is normally mounted on a panelboard behind the shallow compartment 21g, and the sides 21a and 21b of the box are slotted, as at a slot 21h in FIG. 5, to provide clearance for a circuit breaker operating handle 25 when it is desired to replace a circuit breaker 23 without disturbing the mounting of the box 21 on the panelboard. The shallow rear wall portion 21d is provided with a central scalloped aperture 21j (FIGS. 1, 3, and 4) permitting access to load line connectors (not shown) of a circuit breaker, and the aperture 21j includes opposed end slots 21k and 21m respectively joining the slots, such as the slot 21h (FIG. 5), in the sides 21a and 21b of the box 21 to permit passage of a circuit breaker operating handle 25 during replacement of a circuit breaker 23.

Two mounting brackets 26 are secured to the deep rear wall portion 21c adjacent opposite sides of the box 21, preferably by spot welding. Each bracket 26 includes a pair of spaced mounting feet 26a projecting outwardly beyond the respective side 21a or 21b of the box, and each mounting foot 26a is notched to provide a notch 26b.

When the motor starter unit 20 is to be mounted on the righthand side of a bus bar stack of an electrical panelboard of the type disclosed in the aforementioned Pat. No. 3,354,357, the mounting feet 26a adjacent the left side 21a of the box 21 are inserted beneath the rearmost insulator of the bus bar stack, and the mounting feet 26a adjacent the right side 21b are secured to the mounting pan of the panelboard respectively by a pair of screws (not shown) having head portions larger than the notches 26b and threaded shank portions which fit within the notches 26b. Conversely, when the motor starter unit 20 is to be mounted on the left-hand side of the bus bar stack, the mounting feet 26a adjacent the right side 21b of the box 21 are inserted beneath the rearmost insulator of the bus bar stack, and the mounting feet 26a adjacent the left side 21a are secured to the mounting pan of the panelboard respectively by a similar pair of screws (not shown).

Insulation is provided around the rearmost portion of the sidewalls of the box 21. Thus, a relatively thin sheet 28 of phenolic insulating material is secured to the right side 21b by a pair of round-headed double-pronged fasteners 30 and a pair of bent-over tang portions 26c of the respective bracket 26. An identical sheet 28 of insulating material is similarly secured to the left side 21a. A sheet 32 of insulating material is secured to the wall portion 21e by four of the fasteners 30, and a similar sheet 33 of insulating material is secured to a bottom wall 21 of the box by four of the fasteners 30.

A latch member 34 is pivotally mounted on a pin 35 extending through the right side 21b of the box 21 and biased toward a cover latching position by a compression spring 36. The latch member 34 extends through a slot 22a in the cover 22 and has a latching surface 34a, which overlaps a portion of the front surface of the cover in the latching position. The latch member 34 also has a hole 34b for receiving a hasp of a padlock.

Mounted on the cover 22 are a START pushbutton 38, a green ON pilot light 39, a STOP pushbutton 40, a red OFF pilot light 41, and a RESET pushbutton 42, all associated with the motor controller in the compartment 21f, incidental with respect to the present invention, and not herein further described. For a description of the start and stop pushbuttons, reference may be had to Pat. No. 3,370,481.

The external circuit breaker operating mechanism 24 is external of the molded case circuit breaker 23 and is mountable in two different positions in the compartment 21g as shown in FIGS. 3 and 4, and when it is changed from one of the positions to the other, it is rotated through one hundred eighty degrees to reverse it end-for-end, and also shifted laterally of the box 21. The cover 22 is provided with an elongated slot 22b (FIG. 1) which extends nearly the full width of the box 21 to accommodate an external handle 44 of the mechanism 24 in the two different mounting positions of the mechanism.

The mechanism 24 is shown separately in FIGS. 6 and 7 and includes a generally U-shaped housing 46 having a pair of spaced outwardly bent mounting feet 46a and 46b extending from one side and a similar pair of mounting feet 46c and 46d (FIGS. 3 and 4) extending from the other side. Each mounting foot of the housing 46 has a keyhole-shaped aperture 46e (FIGS. 3 and 4) for receiving a mounting screw.

Figure 9:
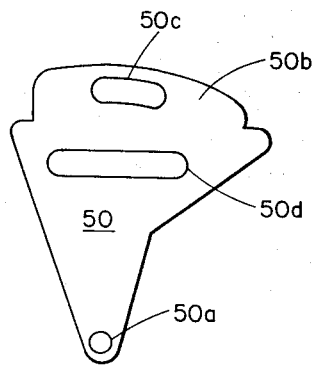
FIG. 9 is a side view of a locking plate of the circuit breaker operating mechanism.

A mounting pin 48 (FIGS. 6 and 7) extends through both sides of the housing 46 and is retained therein by an enlarged head portion at one end and a pushnut 49 at the other end. A flat, generally triangular locking plate 50 best shown in FIG. 9 is mounted on the pin 48, which extends through a suitable hole 50a in the plate 50. The locking plate 50 is held against movement axially of the pin 48 by a pair of tubular spacers 52 (FIG. 7) mounted on the pin 48 within the housing 46 and disposed respectively on opposite sides of the locking plate 50. A portion 50b of the locking plate extends outwardly of the housing 46 through a suitable slot in a raised boss portion 46f (FIG. 6) of a bight portion 46g (FIG. 7) of the housing and is provided with a slot 50c suitable for receiving a hasp of a padlock to lock the handle 44 in an OFF position. A guide slot 50d (FIG. 9) is provided in the locking plate within the housing 46 for a purpose explained hereinafter.

Figure 10:
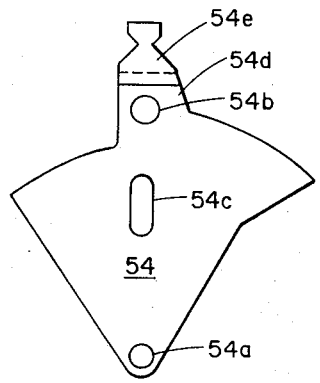
FIG. 10 is a side view of a right-hand handle plate member of the circuit breaker operating mechanism.

The handle 44 includes a pair of generally triangular right-hand and left-hand handle plate members 54 and 55 (FIGS. 6 and 7) pivotally mounted on the pin 48 and disposed respectively on opposite sides of the locking plate 50 and between the tubular spacers 52. The right-hand handle plate member 54 is best shown in FIG. 10 and is provided with a hole 54a for receiving the pin 48, a hole 54b suitable for receiving a hasp of a padlock to lock the handle 44 in an OFF position, and a slot 54c for receiving a drive pin 64 for a purpose hereinafter explained. An external handle portion 54d of the handle plate member 54 extends outwardly of the housing 46. The handle plate member 55 is identical to the handle plate member 54 except that free end portions 54e and 55e of the external handle portions 54d and 55d are outwardly offset in opposite directions, as best shown in FIG. 7. A molded plastic hand grip member formed of two halves 56 and 57 (FIG. 6) is secured to the free end portions 54e and 55e by a rivet 58.

An actuating member 60 for operating a pivotable operating handle of an electric circuit breaker, such as shown on the electrical panelboard of the aforementioned Pat. No. 3,354,357, is reciprocally mounted in the housing 46 for movement by operation of the handle 44. The actuating member 60 also forms part of an interlock for the cover 22, as hereinafter explained.

Figure 11:
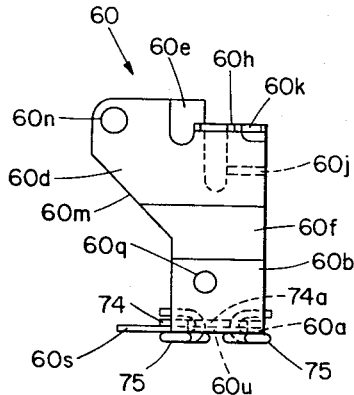
FIG. 11 is a side view of an actuating member of the circuit breaker operating mechanism.
Figure 12:
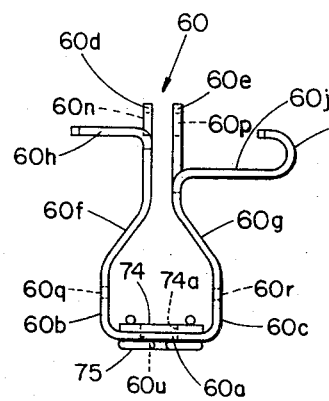
FIG. 12 is an end view of the actuating member of FIG. 11.
Figure 13:
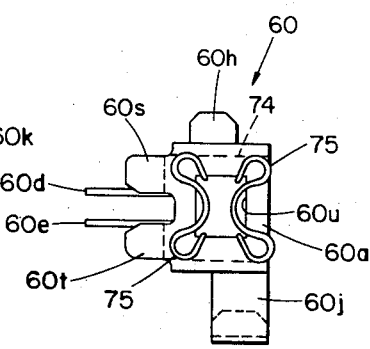
FIG. 13 is a bottom view of the actuating member of FIG. 11.

The actuating member 60 is best shown in FIGS. 11, 12, and 13. With reference to the end view of FIG. 12, the actuating member 60 comprises a generally U-shaped member including a bight portion 60a, a pair of spaced parallel side portions 60b and 60c, and a pair of inwardly offset free end portions 60d and 60e joined respectively to the side portions 60b and 60c respectively by a pair of angularly extending offsetting portions 60f and 60g. An extended portion of the free end portion 60d is bent outwardly to form a tongue 60h cooperable with an interlock bracket 62 (FIGS. 1, 5, 17, 18, and 19) on the cover 22 as hereinafter described. Further, an extended portion of the free end portion 60e is bent outwardly to form a tongue 60j also cooperable with the interlock bracket 62 as hereinafter described. The tongue 60j is reversely curved at an outer end portion 60k.

As can be seen in FIG. 11, the offsetting portion 60f and the free end portion 60d are longer than the side portion 60b in a direction parallel to the bight portion 60a, being partially defined by an inclined edge portion 60m. The offsetting portion 60g and the free end portion 60e are similar respectively to the offsetting portion 60f and the free end portion 60d in this respect. The free end portions 60d and 60e are provided respectively with a pair of aligned holes 60n and 60p for the reception of the drive pin 64 (FIGS. 6 and 7) which also extends through the guide slot 50d (FIG. 9) in the locking plate 50, the slot 54c (FIG. 10) in the handle plate member 54, and a slot (not shown) in the handle plate member 55 similar to the slot 54c. The drive pin 64 is retained in place by an enlarged head portion (not shown) at one end and a pushnut 65 at the other end.

The side portions 60b and 60c are provided respectively with a pair of aligned holes 60q and 60r for the reception of a guide pin 66 which also extends through both sides of the housing 46 and is retained therein by an enlarged head portion at one end and a pushnut 67 at the other end. Each side of the housing 46 is provided with a guide slot, such as the slot indicated by numeral 68 (FIG. 6), in which the pin 66 is received.

As the hand grip member 56–57 is moved back and forth between ON and OFF positions, the handle plate members 54 and 55 pivot on the mounting pin 48 and move the drive pin 64 along the guide slot 50d in the locking plate 50, and the drive pin 64 moves the actuating member 60 back and forth within the housing 46 as the actuating member is guided by movement of the guide pin 66 in the guide slot 68 and the corresponding guide slot (not shown) in the opposite side of the housing 46. An open-end slot 69 (FIG. 6) is provided in one side of the housing 46 to accommodate the tongue 60h, and a similar open-end slot 70 (FIG. 7) is provided in the other side of the housing to accommodate the tongue 60j. A tension spring 72 (FIGS. 1, 2, 6, and 7) is anchored at one end on the drive pin 64 and at the other end on the housing 46 adjacent the open end of the slot 70 to bias the actuating member 60 and the handle 44 toward OFF position.

The actuating member 60 is provided with a pair of tongues 60s and 60t (FIG. 13) extending outwardly from the bight portion 60a for a purpose explained hereinafter. A spacer plate 74 for a pair of resilient gripping members 75 is welded to the inside of the bight portion 60a. A generally rectangular aperture 60u is provided in the bight portion 60a and a similar aperture 70a is provided in the spacer plate 74 for the reception of an operating handle of a molded case circuit breaker, such as the operating handle 25 of the circuit breaker 23, and resilient gripping thereof by the gripping members 75. The spacer plate 74 adds sufficient thickness to the bight portion 60a to enable the resilient gripping members 75, made of spring wire, to be retained in place by friction. Further, the spacer plate 74 may be made of hardened steel to prevent undue wear on the bight portion 60a.

A hood 76 is pivotally mounted on the housing 46 adjacent one end thereof by a pair of rivets 77 and 78. The hood 76 extends to the right, as viewed in FIG. 6, beyond the housing 46 to act as a filler plate in the portion of the slot 22b of the cover 22 not filled by the housing 46 in a particular mounting position of the circuit breaker operating mechanism 24. The hood 76 is slotted to receive the boss portion 46f of the housing 46, and the projecting end portion is provided with a corresponding boss portion 76a. The pivotal mounting of the hood 76 enables pivoting thereof to provide access to a load line connector (not shown) for the center pole of a three-pole circuit breaker, such as the circuit breaker 23, mounted behind the compartment 21g when the circuit breaker and the motor starter unit 20 are mounted on a panelboard.

Inside the housing 46, an interlock member 80 best shown in FIGS. 14, 15 and 16 is pivotally mounted on the rivet 77. The member 80 includes a flat elongated body portion 80a, an inwardly offset mounting ear portion 80b, and an outwardly offset cover-actuated driving arm portion 80c. The mounting ear portion 80b is provided with a hole 80d for reception of the rivet 77 and a hole 80e for reception of one end portion of a torsion spring 81 also mounted on the rivet 77 and having its other end portion held by a tang 46h bent inwardly from a side of the housing 46. The spring 81 biases the member 80 counterclockwise as viewed in FIG. 6. The left side of the housing 46 as viewed in FIG. 7 is provided with a generally rectangular aperture 46j (FIG. 6) through which the driving arm portion 80c extends, the aperture 46j being sufficiently large to permit a limited amount of pivotal movement of the member 80.

Figure 8:
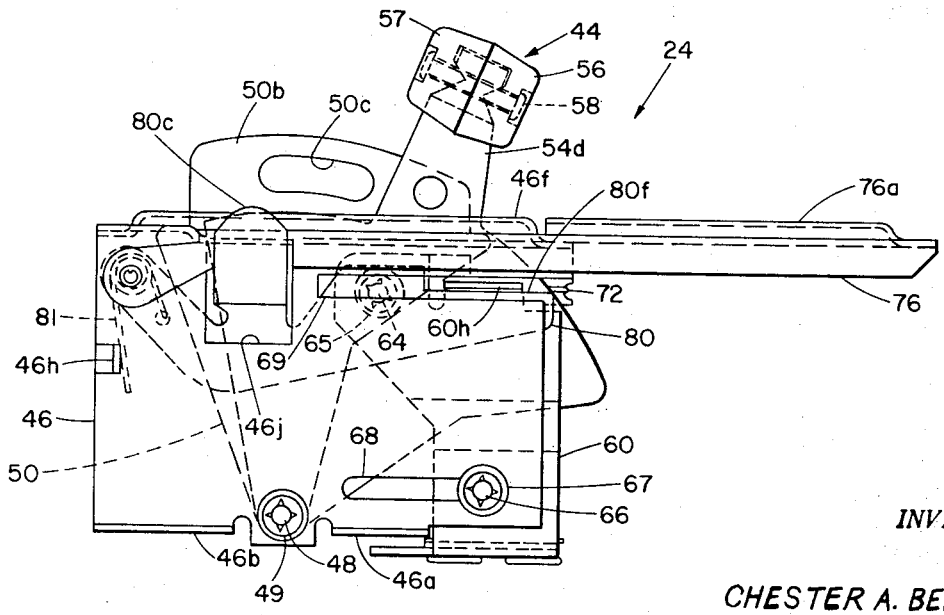
FIG. 8 is a view similar to FIG. 6, but with the handle of the circuit breaker operating mechanism in an OFF position.

The member 80 is shown in FIG. 6 in the same position as that in which it appears in FIG. 2, with the handle 44 in an ON position. When the circuit breaker operating mechanism 24 is removed from the box 21, it normally appears as shown in FIG. 8, with the handle 44 in an OFF position and the member 80 pivoted counterclockwise from the position in which it appears in FIG. 6 to a position in which a surface 80f (FIGS. 14 and 15) of the body portion 80a engages the tongue 60h of the actuating member 60. The member 80 is designed to prevent movement of the handle 44 from the OFF to the ON position when the cover 22 is open. With reference to FIGS. 8, 14, 15, and 16, upon attempted movement of the handle 44 to ON position, the actuating member 60 moves to the left, and the tongue 60h moves along the surface 80f until it engages a stop shoulder portion 80g, after which no further movement takes place. When the cover 22 is closed, as shown in FIG. 2, it depresses the driving arm portion 80c to move the stop shoulder portion 80g out of blocking relationship with the tongue 60h and permits movement of the handle 44 to ON position, in which the tongue 60h engages a surface 80h (FIGS. 14, 15, and 16) of the body portion 80a.

The interlock bracket 62 is best shown in FIGS. 17, 18 and 19 and includes a generally flat, elongated rectangular mounting portion 62a having a generally square aperture 62b therein for reception of a slotted-head mounting and driving rivet 82 (FIG. 1). The cover 22 is dished inwardly around the head of the rivet 82 to provide a recess therefor, the outer surface thereof being substantially flush with the remainder of the cover. The mounting portion 62a is provided with a slot 62c adjacent the left end thereof as viewed in FIG. 17, forming a tab portion 62d which is offset outwardly from the major portion of the mounting portion 62a, as best shown in FIG. 18. Adjacent the other end, the mounting portion 62a is provided with a pair of spaced slots similar to the slot 62c, and the portion between the slots is bent inwardly to form a spring anchoring tongue portion 62e having an aperture 62f (FIG. 19) therein in which one end portion of a tension spring 83 (FIGS. 1 and 5) is anchored. An outwardly offset tab portion 62g is provided adjacent the tongue portion 62e. The amount that the tab portions 62d and 62g are offset is sufficient to enable them to bear against the inner surface of the cover 22 while the mouting portion 62a bears against the inwardly dished portion (not shown in detail) of the cover 22 around the head of the rivet 82.

Extending inwardly from an upper edge portion of the mounting portion 62a is an interlock portion 62h provided adjacent opposite ends respectively with a pair of reversely curved tongues 62j and 62k, the tongue 62j being curved upwardly and the tongue 62k being curved downwardly.

The shallow rear wall portion 21d of the box 21 is provided with two spaced parallel rows of four tapped holes in which a plurality of screws 84 may be captively mounted. The mounting feet 46a, 46b, 46c and 46d of the housing 46 are respectively slipped over the heads of four of the screws 84 and the screws tightened over the small portions of the keyhole slots to secure the circuit breaker operating mechanism 24 in place. When the motor starter unit 20 is to be mounted to the right of a bus bar stack as shown in the aforementoned Pat. No. 3,354,357, the operating mechanism 24 is mounted as shown in FIGS. 1–3 using the four screws 84 closer to the left side 21a of the box 21. When the motor starter unit 20 is to be mounted to the left of a bus bar stack, the operating mechanism 24 is mounted as shown in FIG. 4 using the four screws 84 closer to the right side 21b of the box 21.

The tongues 60s and 60t on the actuating member 60 are provided to interfere with a circuit breaker handle if an attempt is made to mount the operating mechanism 24 incorrectly in a central position using the central four screws 84. If the tongues 60s and 60t were not provided, the actuating member 60 could be placed next to a circuit breaker handle, such as the handle 25, in an incorrect central mounting of the operating mechanism 24, rather than over the handle 25 using the aperture 60u, and the actuating member 60 could then push the circuit breaker handle 25 to an ON position, but would not be able to pull it back to an OFF position, and an OFF position of the handle 44 would then give a false indication of the position of the circuit breaker handle 25.

A bracket 85 best shown in FIGS. 20, 21, and 22 is rigidly secured to the inside of the cover 22 and includes a generally flat rectangular plate 85a slotted at opposite ends to provide tab portions of which a tab portion 85b is bent inwardly substantially ninety degrees and provided with a hole 85c through which the other end of the tension spring 83 is anchored, and a second tab portion 85d generally diagonally opposite the tab portion 85b is bent inwardly through a lesser angle. The spring 83 tends to rotate the interlock bracket 62 and rivet 82 clockwise as viewed in FIG. 1, the tab 85d serving as a stop against which the tab portion 62g abuts.

When the operating mechanism 24 is mounted as shown in FIGS. 1–3 and the cover 22 is closed and the handle 44 is in ON position, the tongue 60h of the actuating member 60 is in alignment with the curved tongue 62j as it appears in FIG. 1 and the curved tongue 62j is "hooked" in back of the tongue 60h as shown in FIG. 23 to prevent opening of the cover 22. However, a knowledgeable person may defeat the interlock so as to be able to open the cover 22 with the handle 44 in ON position by turning the rivet 82 with a tool such as a screwdriver counterclockwise as viewed in FIG. 1 to rotate the curved tongue 62j downwardly (to the left in FIG. 23) and out from in back of the tongue 60h.

When the operating mechanism is mounted as shown in FIG. 4 and the cover 22 is closed and the handle 44 is in ON position, the tongue 60j of the actuating member 60 is in alignment with the curved tongue 62k as it appears in FIG. 1 and the curved tongue 62k is "hooked" in back of the curved outer end portion 60k of the tongue 60j as shown in FIG. 24 to prevent opening of the cover 22. However, a knowledgeable person may defeat the interlock so as to be able to open the cover 22 with the handle 44 in ON position by turning the rivet 82 with a tool such as a screwdriver counterclockwise as viewed in FIG. 1 to rotate the curved tongue 62k upwardly (to the right in FIG. 24) and out from in back of the curved outer end portion 60k of the tongue 60j.

Thus, regardless of the position in which the operating mechanism 24 is mounted, the cooperation between the interlock bracket 62 and the actuating member 60 prevents opening of the cover 22 when the handle 44 is in ON position, except by defeat of the interlock. Further, regardless of the position in which the operating mechanism 24 is mounted, the cooperation between the actuating member 60 and the interlock member 80 prevents movement of the handle 44 to ON position when the cover 22 is open.

I claim:

1. For use in association with an electrical panelboard and a molded-case circuit breaker, the panelboard having a plurality of vertically extending bus bars arranged in a stack from the back to the front of the panelboard and the circuit breaker having an operating handle extending outwardly of the casing and also having a plurality of plug-on terminals respectively pluggable onto the bus bars selectively from opposite sides of the stack in the mounting of the circuit breaker on the panelboard selectively on opposite sides of the stack, a motor starter unit comprising a box mountable on the panelboard selectively on opposite sides of but in the same relative angular relationship with the stack, and an external circuit breaker operating mechanism mountable in the box selectively in two angularly displaced mounting positions with respect thereto in accordance with selected mounting positions of the circuit breaker and the box and connectible to the operating handle of the circuit breaker.

2. A motor starter unit as claimed in claim 1 wherein the two angularly displaced mounting positions of the operating mechanism in the box are also displaced horizontally from each other.

3. A motor starter unit as claimed in claim 1 wherein the box has a relatively deep compartment for housing a motor controller and a relatively shallow compartment for housing the operating mechanism.

4. A motor starter unit as claimed in claim 3 wherein the shallow compartment is disposed above the deep compartment in a normal mounting position of the box.

5. A motor starter unit as claimed in claim 3 wherein the shallow compartment of the box is provided with two horizontally extending vertically spaced rows of four mounting holes and the operating mechanism includes a housing having four rectangularly spaced mounting holes.

6. A motor starter unit for use on an electric circuit breaker panelboard having a mounting pan with mounting space for a plurality of circuit breakers and having a circuit breaker with an operating handle mounted in a portion of the mounting space, the motor starter unit comprising a box mountable on the mounting pan in another portion of the mounting space and having a stepped rear wall partially defining a relatively deep compartment for housing a motor controller and a relatively shallow compartment for disposition in overlying relationship to the circuit breaker, and an external breaker operating mechanism mountable in the shallow compartment and having an external handle operatively connected to the operating handle of the circuit breaker upon mounting of the external circuit breaker operating mechanism in the shallow compartment and mounting of the box on the mounting pan.

References Cited

UNITED STATES PATENTS

| 3,301,989 | 1/1967 | Ericson | 200—172 R |
| 3,141,947 | 7/1964 | Daly et al. | 200—172 R |
| 2,646,488 | 7/1953 | Platz | 200—172 R |

H. O. JONES, Primary Examiner

U.S. Cl. X.R.

200—172A; 317—119